United States Patent
Roberge

(10) Patent No.: US 10,119,412 B2
(45) Date of Patent: Nov. 6, 2018

(54) TURBINE ENGINE ADAPTIVE LOW LEAKAGE AIR SEAL

(71) Applicant: UNITED TECHNOLOGIES CORPORATION, Hartford, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 534 days.

(21) Appl. No.: 14/768,769

(22) PCT Filed: Mar. 10, 2014

(86) PCT No.: PCT/US2014/022403
§ 371 (c)(1),
(2) Date: Aug. 19, 2015

(87) PCT Pub. No.: WO2014/164426
PCT Pub. Date: Oct. 9, 2014

(65) Prior Publication Data
US 2016/0003085 A1 Jan. 7, 2016

Related U.S. Application Data
(60) Provisional application No. 61/779,079, filed on Mar. 13, 2013.

(51) Int. Cl.
*F01D 11/20* (2006.01)
*F16J 15/43* (2006.01)
(52) U.S. Cl.
CPC .............. *F01D 11/20* (2013.01); *F16J 15/43* (2013.01); *F05D 2300/507* (2013.01)

(58) Field of Classification Search
CPC ....... F01D 11/20; F01D 15/43; F01D 2300/50
See application file for complete search history.

(56) References Cited

U.S. PATENT DOCUMENTS 3,572,728 A * 3/1971 Smuland ................ F01D 11/02
277/419
4,386,784 A * 6/1983 Banks .................... F01D 5/225
277/410

(Continued)

FOREIGN PATENT DOCUMENTS

EP 0182656 5/1986
EP 0837224 4/1998

(Continued)

OTHER PUBLICATIONS

International Preliminary Report on Patentability for International Application No. PCT/US2014/022403 dated Sep. 24, 2015.

(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

An air seal includes a sealing gland configured to retain a ferro-fluid and one or more seals. A portion of the one or more seals is configured to extend into the sealing gland. A gas turbine engine, includes the air seal. A method of sealing low pressure air from high pressure air, includes the steps of providing a sealing gland configured to retain a ferro-fluid, distributing the ferro-fluid into the sealing gland, providing one or more seals, wherein a portion of the one or more seals is configured to extend into the sealing gland, and removing the ferro-fluid from the sealing gland.

16 Claims, 10 Drawing Sheets

(56) References Cited

U.S. PATENT DOCUMENTS

| | | | |
|---|---|---|---|
| 4,444,398 A | 4/1984 | Black, Jr. et al. | |
| 4,738,586 A * | 4/1988 | Harter | F01D 5/20 415/173.5 |
| 5,092,611 A * | 3/1992 | Ehmsen | F16J 15/43 277/410 |
| 6,131,910 A * | 10/2000 | Bagepalli | F01D 5/225 277/355 |
| 6,857,635 B1 | 2/2005 | Li et al. | |
| 7,256,523 B2 * | 8/2007 | Kummeth | F16C 32/0438 310/90.5 |
| 2005/0042092 A1 | 2/2005 | Boegli et al. | |
| 2006/0222490 A1 * | 10/2006 | Senoo | F01D 5/143 415/191 |
| 2006/0254540 A1 * | 11/2006 | Tuttle | F01P 7/042 123/41.49 |
| 2008/0138190 A1 | 6/2008 | Kawai et al. | |
| 2008/0224808 A1 * | 9/2008 | Ghiron | A61N 2/006 335/300 |
| 2010/0327534 A1 * | 12/2010 | Powar | F01D 11/02 277/355 |
| 2010/0327537 A1 * | 12/2010 | Johnson | H02K 5/128 277/405 |
| 2012/0051930 A1 * | 3/2012 | Pandey | F01D 5/143 416/223 A |
| 2013/0034424 A1 | 2/2013 | Webster et al. | |

FOREIGN PATENT DOCUMENTS

| | | |
|---|---|---|
| WO | 03044351 | 5/2003 |
| WO | 2010068780 | 6/2010 |

OTHER PUBLICATIONS

International Search Report and Written Opinion for PCT Application No. PCT/US2014/022403, dated Jul. 4, 2014.

\* cited by examiner

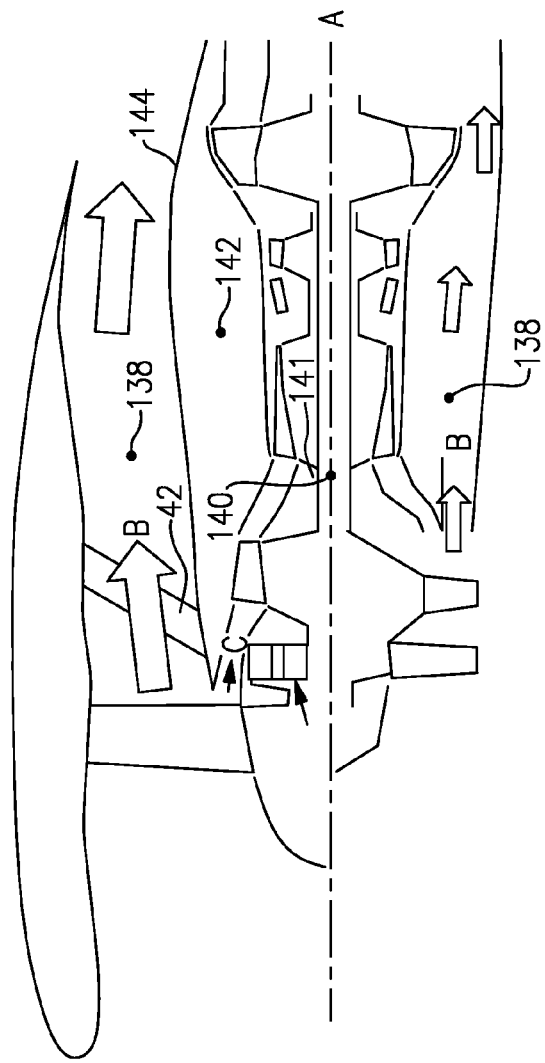
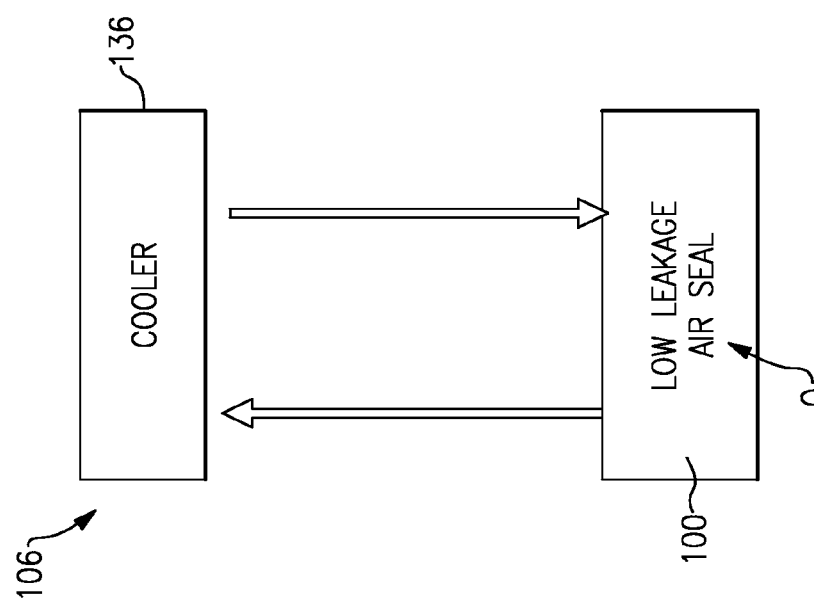
FIG.10B
FIG.10A

TURBINE ENGINE ADAPTIVE LOW LEAKAGE AIR SEAL

BACKGROUND

This disclosure relates to a gas turbine engine component, such a low-leakage air seal.

Gas turbine engines typically include a fan section, a compressor section, a combustor section and a turbine section. The fan section may be housed in a fan case. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines use various types of sealing concepts to control or prevent leakage of air from higher pressure areas to lower pressure areas. Locations can include secondary (internal) flow seals intended to isolate cooler, lower pressure air for thermal conditioning of components (disks, shafts, etc.) and for establishing appropriate thermal environments for oil filled bearing compartments and other thermally sensitive components. For example, the source of secondary/ internal air comes from the engine flow path. Removal of this air—often already partially compressed via the engine's compression system—represents a loss to engine efficiency.

In another example, seals where radial clearances between rotating knife edges and static cases form gaps through which higher pressure flow can circulate to lower pressure regions. In this example, the undesired circulation of flow detracts from either compressor (where work is added to the fluid to increase pressure) or turbine (where work is removed from the fluid thereby reducing pressure) efficiency. This leakage also has an adverse and more pronounced impact on component and overall cycle efficiency. Current sealing concepts between rapidly rotating components and static structures often use a knife-edge rotating against an abradable surface (for example, honeycomb, porous metal, aluminum polyester or another material). During engine operation, a combination of axial and radial displacements create wear, which can degrade the effectiveness of the seal during subsequent operation.

SUMMARY

In one exemplary embodiment, an air seal includes a sealing gland configured to retain a ferro-fluid and one or more seals. A portion of the one or more seals extends into the sealing gland.

In a further embodiment of the above, the sealing gland is subject to a magnetic field.

In a further embodiment of any of the above, at least one rotating seal is a knife-edge seal.

In a further embodiment of any of the above, at least one rotating seal is an airfoil tip seal.

In a further embodiment of any of the above, the sealing gland extends circumferentially around a rotor. The rotor including at least one rotating seal.

In a further embodiment of any of the above, the air seal comprises a ferro-fluid collection drain and a ferro-fluid collection tank.

In a further embodiment of any of the above, the air seal comprises a cooler configured to change the temperature of the ferro-fluid.

In a further embodiment of any of the above, at least one rotating seal includes a magnetic field configured to repel the ferro-fluid.

In a further embodiment of any of the above, at least one rotating seal is located on a seal arm that extends from a rotating component. The seal is arranged perpendicular to an axis of rotation of the rotating component.

In another exemplary embodiment, a gas turbine engine includes a high pressure area and a low pressure area. A sealing gland is subject to a magnetic field and is configured to retain a ferro-fluid. A rotating component has at least one seal that is configured to seal the high pressure area from the low pressure area. At least a portion of the seal extends into the sealing gland.

In a further embodiment of the above, at least one seal is a knife edge seal.

In a further embodiment of any of the above, the rotating component is an airfoil blade.

In a further embodiment of any of the above, at least one seal is located on a seal arm that extends from a rotating component. The seal is arranged perpendicular to an axis of rotation of the rotating component.

In a further embodiment of any of the above, the gas turbine engine further comprises a cooler that is configured to change the temperature of the ferro-fluid.

In a further embodiment of any of the above, the cooler is located in one of a bypass flowpath, a secondary internal engine flowpath, and a fuel/oil cooler.

In another exemplary embodiment, a method of sealing low pressure air from high pressure air includes the steps of providing a sealing gland configured to retain a ferro-fluid, distributing the ferro-fluid into the sealing gland and providing at least one rotating seal. A portion of the rotating seal is configured to extend into the sealing gland and interact with the ferro-fluid and remove the ferro-fluid from the sealing gland.

In a further embodiment of the above, the step of distributing the ferro-fluid into the sealing gland further comprises the steps of applying an alternating magnetic field to the sealing gland, allowing the ferro-fluid to form a uniform layer in the sealing gland and applying a static magnetic field to the sealing gland.

In a further embodiment of any of the above, the method further comprises the step of adjusting the magnetic field to adjust the ferro-fluid to air surface.

In a further embodiment of any of the above, the ferro-fluid is distributed into the sealing gland during an engine start-up sequence.

In a further embodiment of any of the above, the ferro-fluid is removed from the sealing gland during engine shut-down.

BRIEF DESCRIPTION OF THE DRAWINGS

The disclosure can be further understood by reference to the following detailed description when considered in connection with the accompanying drawings wherein:

FIG. 10a illustrates a low leakage air seal with a cooler.

FIG. 10b illustrates a portion of the schematic gas turbine engine with example cooler locations.

DETAILED DESCRIPTION

Figure 1:
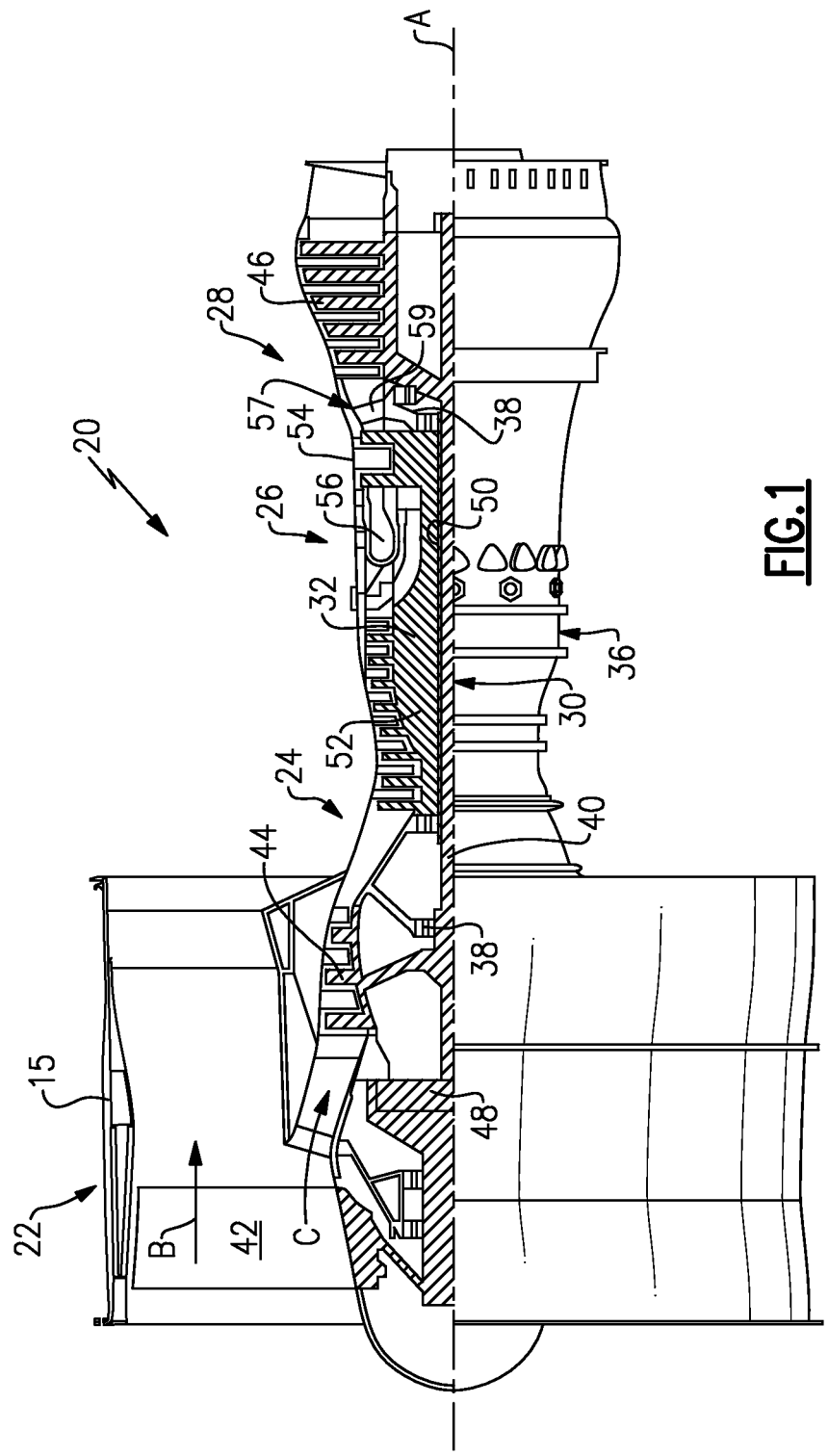
FIG. 1 schematically illustrates an example gas turbine engine embodiment.

FIG. 1 schematically illustrates an example gas turbine engine 20 that includes a fan section 22, a compressor section 24, a combustor section 26 and a turbine section 28. The fan section 22 is arranged in a fan case 23. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The fan 42 includes fan blades with tips 43. The inner shaft 40 drives the fan 42 through a speed change device, such as a geared architecture 48, to drive the fan 42 at a lower speed than the low pressure compressor 44 and low pressure turbine 46. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 m). The flight condition of 0.8 Mach and 35,000 ft (10,668 m)., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram °R)/(518.7 °R)]0.5. The "Low corrected fan tip speed", as disclosed herein according to one non-limiting embodiment, is less than about 1150 ft/second (350 m/second).

Figure 2A:
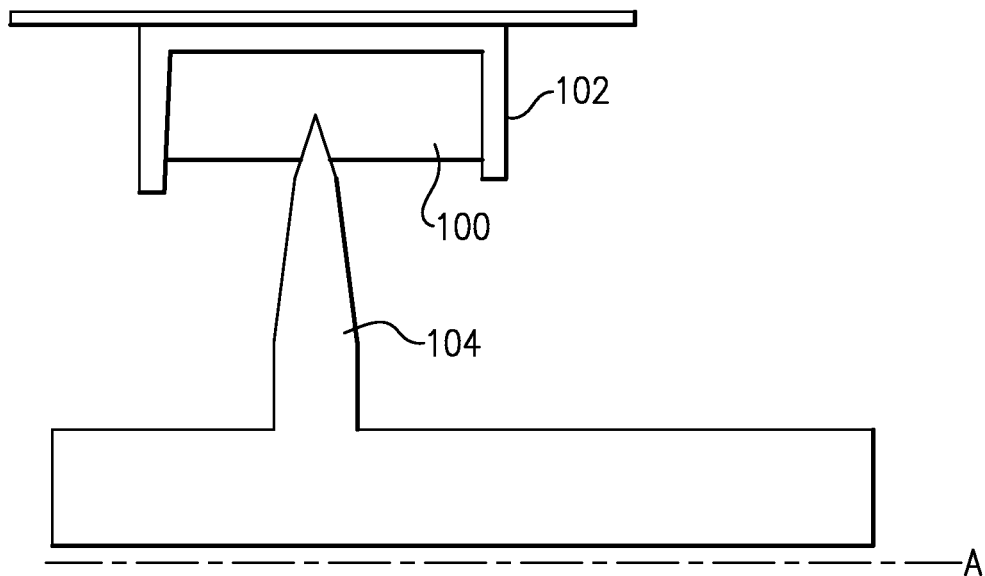
FIG. 2a illustrates a schematic view of a low-leakage air seal.
Figure 2B:
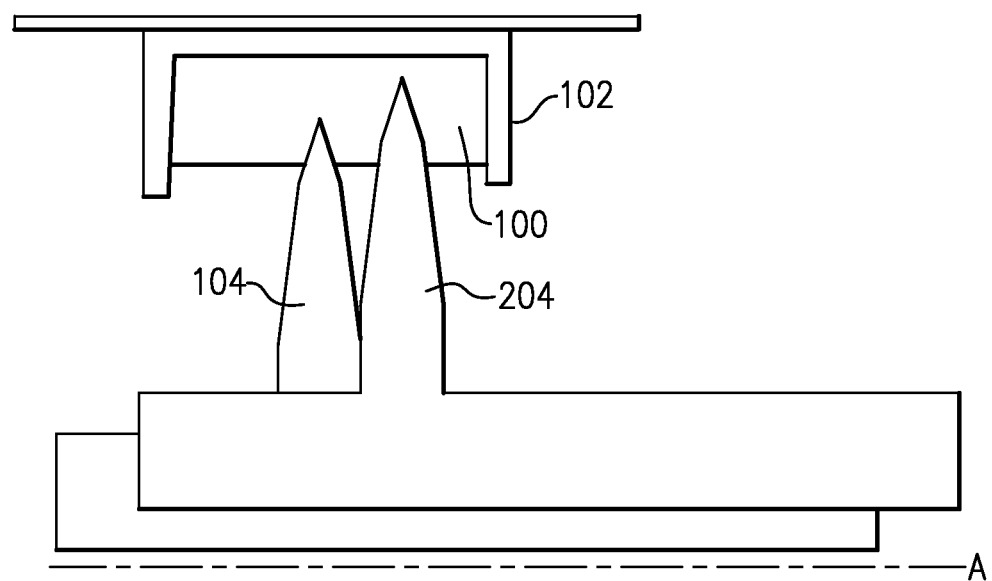
FIG. 2b illustrates a schematic view of the low-leakage air seal of FIG. 2a in operation.

As is shown schematically in FIGS. 2a-2b, a ferro-fluid 100 (or other magnetically controlled or magnetorheological fluid) is suspended by a controlled magnetic field in a static seal gland 102 and provides a surface for a rotating seal 104 to interact with. The seal 104 extends into the seal gland 102 and interacts with the ferro-fluid 100. In this example, the seal 104 is a knife edge seal. In another example, it may be another kind of seal. Seal 104 rotates about the axis A. Referring to FIG. 2b, the seal 104 may shift during operation. The interaction between the seal 104 and the ferro-fluid 100 and the associated sealing characteristic is maintained over a range of axial and radial relative motion of the seal 104. For example, if the seal 104 shifts to the position of seal 204, the sealing characteristic is maintained by the ferro-fluid 100. That is, the seal 104 still interacts with the ferro-fluid 100 in the example shifted position 204.

Figure 3:
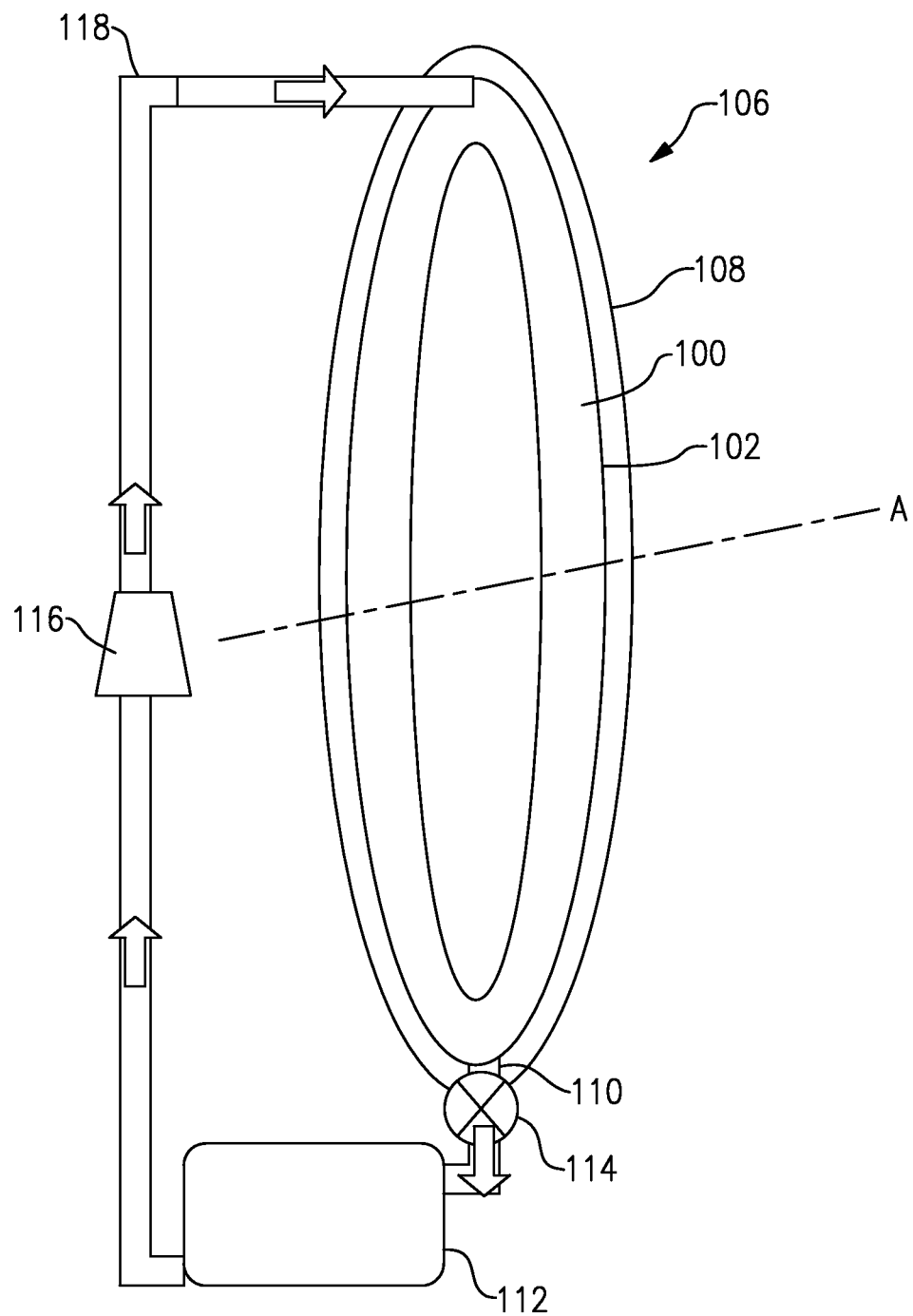
FIG. 3 illustrates a low-leakage air seal system.

FIG. 3 depicts a general schematic of a ferro-fluid sealing system 106 allowing for collection of the ferro-fluid 100, for example, during engine shut down, lack of engine operation, or other instances where the magnetic field may be removed. The system 106 may also distribute the ferro-fluid 100 during the engine starting sequence. The system 106 includes a circumferential magnetic field generator 108, for example, an electromagnet or another device, which provides a magnetic field to the static seal gland 102. A ferro-fluid collection drain 110 allows the ferro fluid 100 to drain into a collection tank 112. A valve 114 may control the flow of ferro-fluid 100 through the collection drain 110 and into the collection tank 112. The collection drain 110 may hold excess ferro-fluid 100 when the magnetic field is reduced, and the collection tank 112 may hold ferro-fluid 100 during engine shut-down. A pump 116 may move the ferro-fluid 100 through the system 106. During engine startup, ferro-fluid 100 may be drawn from the collection tank 112 via a ferro-fluid collection supply 118 and delivered to the seal gland 102.

Figure 4A:
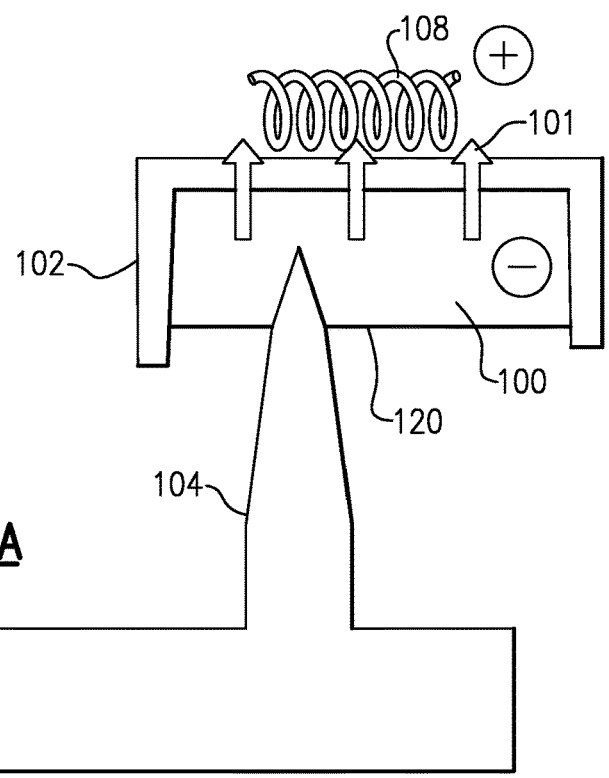
FIG. 4a illustrates a schematic view of the low-leakage air seal with a magnetic field.
Figure 4B:
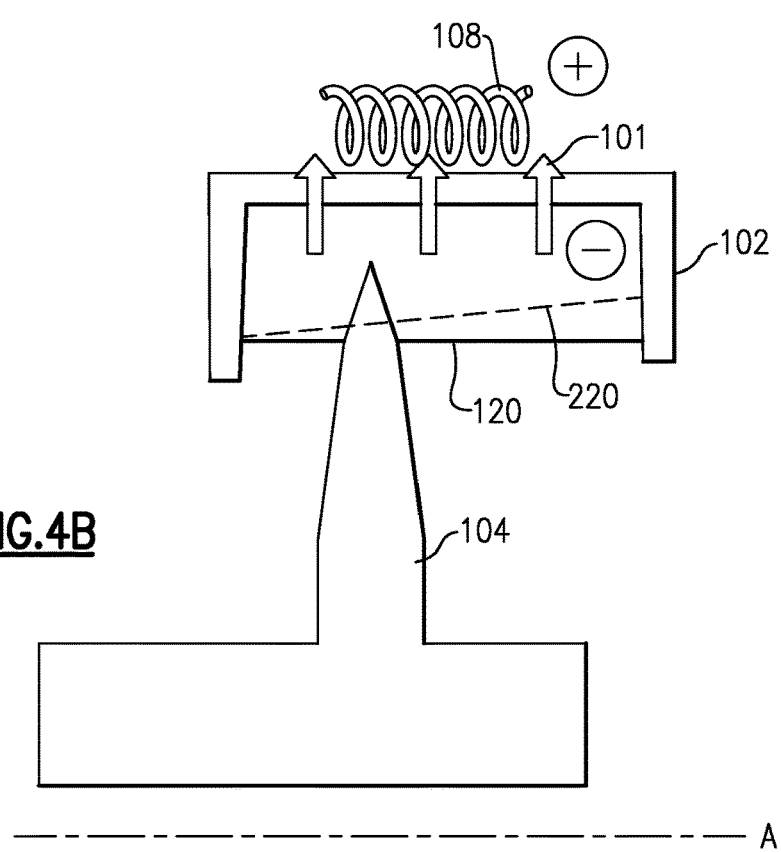
FIG. 4b illustrates a schematic view of the low-leakage air seal of FIG. 4a with an adjusted ferro-fluid-to-air surface profile.

FIGS. 4a-4b depict the magnetic interaction of the ferro-fluid 100 and the static sealing gland 102. The magnetic field 101 generated by the magnetic field generator 108 causes the negatively-charged ferro-fluid 100 to be pulled into the sealing gland 102. The air-to-ferro-fluid surface 120 may be tailored under both steady-state and transient operating conditions. The surface 120 may be altered for various operating conditions, such as engine start, acceleration, or deceleration, engine surge or variation or reversal of high pressure/load conditions, or engine shut down or re-light, depending on the desired sealing characteristics. Referring to FIG. 4b, the air-to-ferro fluid surface 120 may be adjusted by preferentially controlling the magnetic field 101 to enable or disable ferro-fluid 100 distribution within the seal gland 102. For example, the surface 120 may take on a profile 220.

While the ferro-fluid 100 under the influence of the magnetic field 101 does not act as a solid, it is recognized that interaction between the rotating knife-edge seal 104 and the ferro-fluid 100 will have frictional characteristic that can contribute to a loss in system efficiency (for example, by inducing rotor drag, fluid heat-up, etc.). In one example shown schematically in FIG. 5, a repelling magnetic field 122 in the rotating knife-edge seal 104 is used at the micro-level to repel the ferro-fluid 100 to reduce friction. It is recognized that this reduction in friction may be accompanied by a minor increases in leakage around the seal 104.

Figure 6:
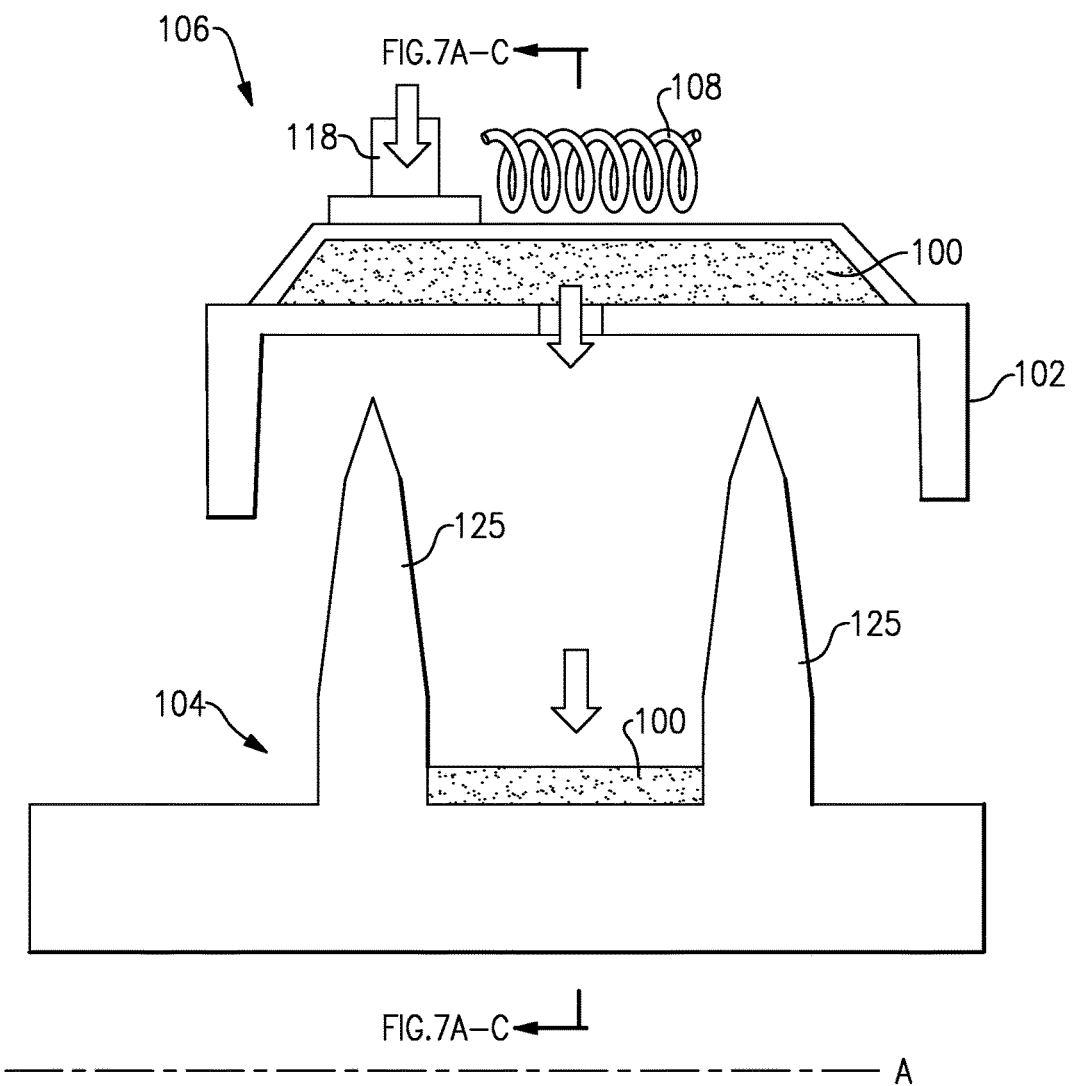
FIG. 6 illustrates a schematic view of the low-leakage air seal during start-up.

As is shown schematically in FIG. 6, the seal 104 may have multiple teeth 125. While the magnetic field 101 (not shown) is being generated, for example, during initial engine motoring pre-start sequence, ferro-fluid 100 is distributed to the sealing gland 102 from the ferro-fluid collection supply 118. Initially, ferro-fluid 100 may collect between teeth 125.

Figure 5:
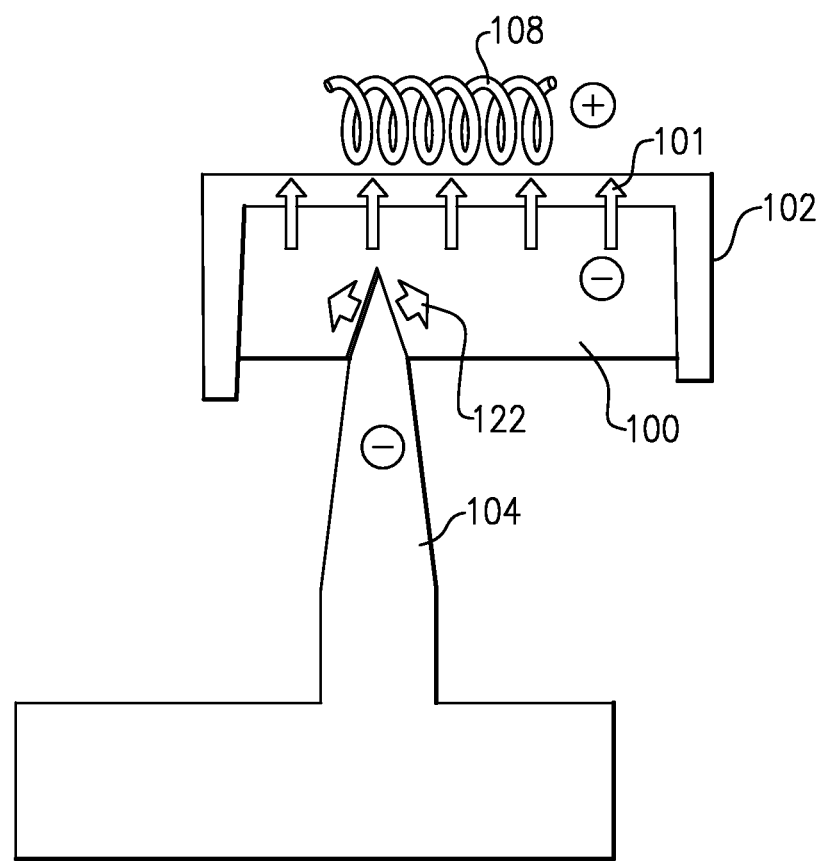
FIG. 5 illustrates a schematic view of the low-leakage air seal with the seal having a repelling magnetic field.
Figure 7C:
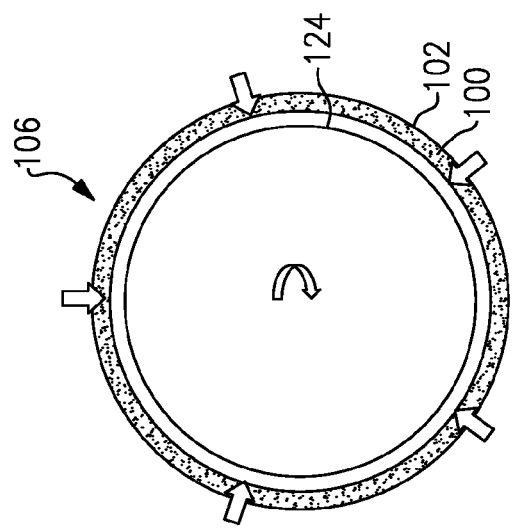
FIG. 7c illustrates a cross-sectional view of the low-leakage air seal of FIG. 6 at a third time point during start up.
Figure 7B:
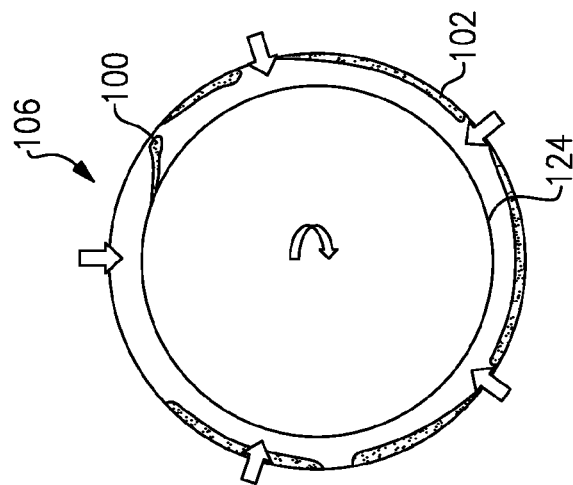
FIG. 7b illustrates a cross-sectional view of the low-leakage air seal of FIG. 6 at a second time point during start up.
Figure 7A:
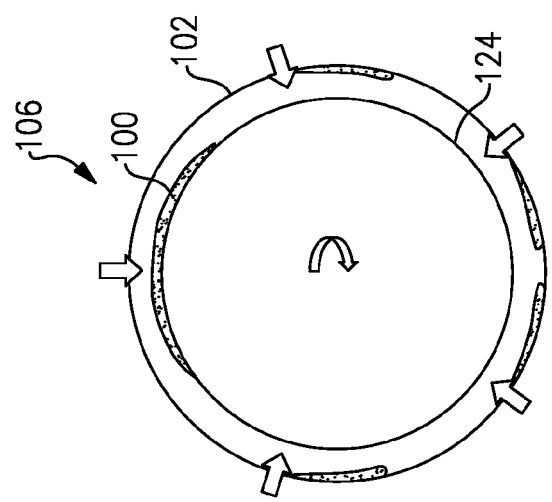
FIG. 7a illustrates a cross-sectional view of the low-leakage air seal of FIG. 6 at a first time point during start up.

FIGS. 7a-7c show a cross sectional view of the system 106 of FIG. 6 at three different time points during start-up and ferro-fluid 100 distribution. A rotor 124 includes the seal 104 (FIG. 6). The rotor 124 inertia and the magnetic field 101 (not shown) form a uniform distribution of fluid that is sustained by the magnetic field 101 in response to gravitational and other forces. Referring to FIG. 7a, the ferro-fluid 100 is introduced into the sealing gland 102 when the rotor starts up and is rotating slowly. The static magnetic field 101 is turned off. The dominant fluid distribution force is gravity. Referring to FIG. 7b depicting a second time point in the ferro-fluid 100 distribution, the ferro-fluid 100 moves radially outward in the sealing gland 102 as the magnetic field 101 (not shown) is applied in an alternating manner. This allows ferro-fluid friction/inertia forces to distribute the ferro-fluid 100. In this stage, inertia and magnetism are the dominant ferro-fluid distribution forces. Referring to FIG. 7c depicting a third time point in the ferro-fluid 100 distribution process, the ferro-fluid 100 has formed a uniform layer and the magnetic field 101 is static, allowing the ferro-fluid 100 to overcome rotor 124 friction. Inertia interaction may be influenced by a repelling magnetic field 122 surrounding rotating seal 104 (FIG. 5). The dominant ferro-fluid 100 distribution force in this stage is magnetism.

Figure 8B:
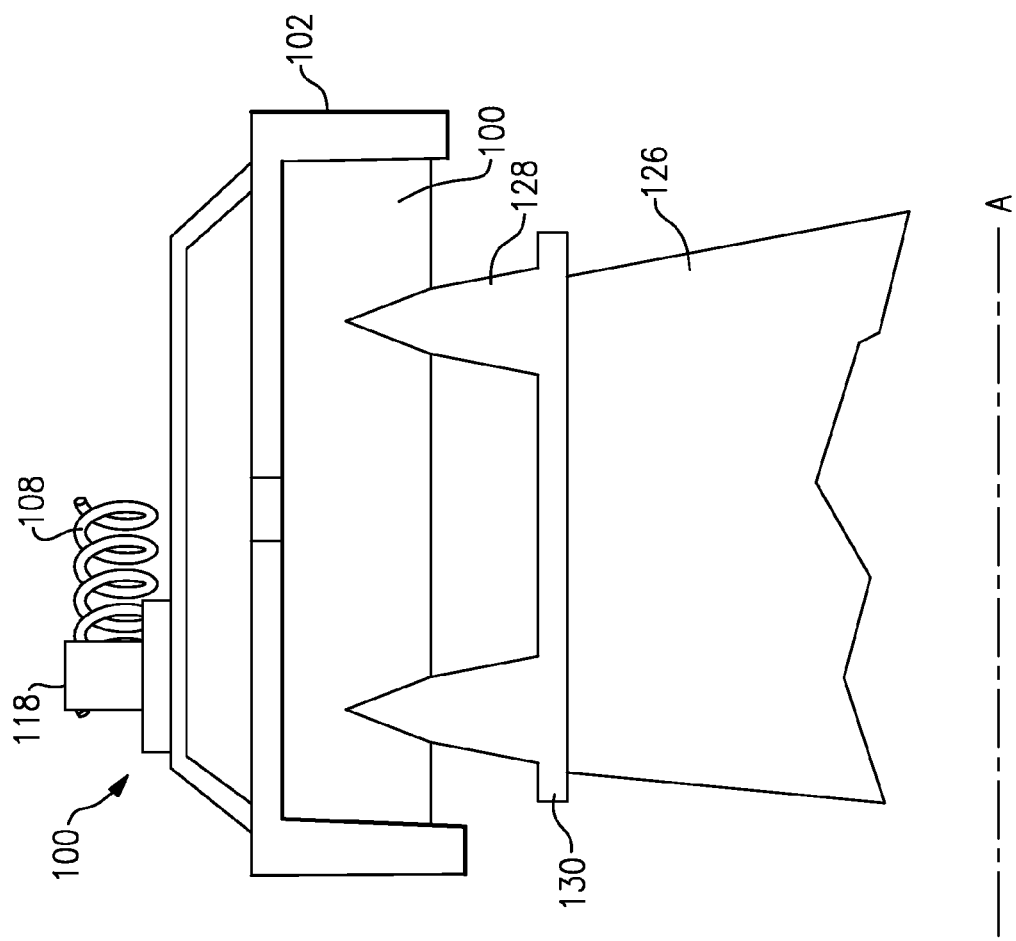
FIG. 8b illustrates the airfoil of FIG. 8a including the low-leakage air seal.
Figure 8A:
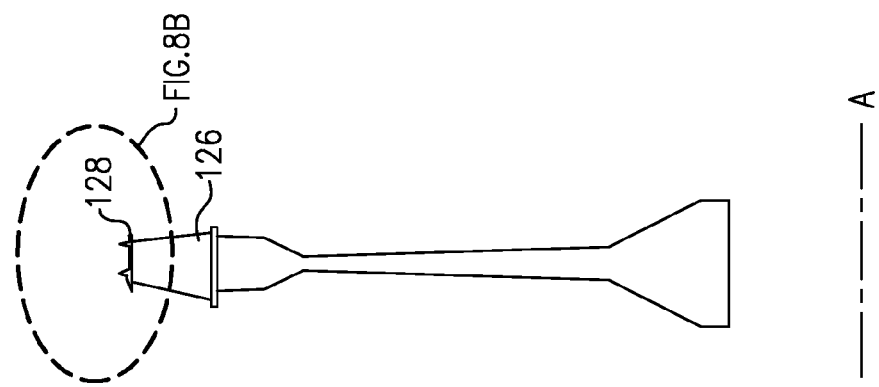
FIG. 8a illustrates an airfoil having an air seal.

In one example, the low-leakage air seal can be used for an airfoil tip seal. Referring to FIGS. 8a and 8b, an airfoil 126 may include tip seals 128 on a full-hoop outer shroud 130. The tip seals 128 interact with the ferro-fluid 100.

Figure 9:
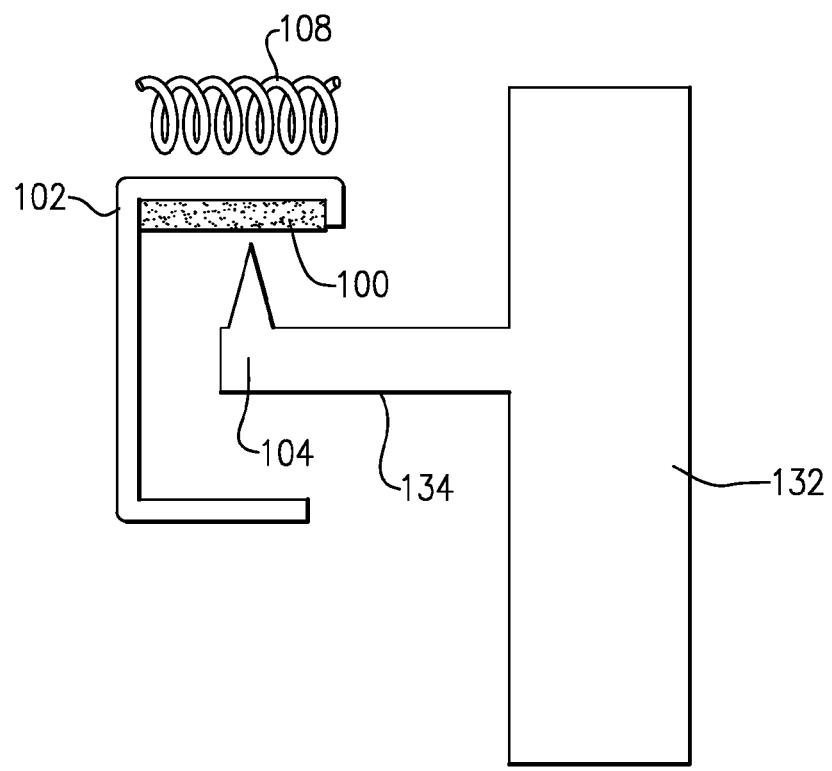
FIG. 9 illustrates a low-leakage air seal mounted on a sealing arm.

In another example, the low-leakage air seal can be used for an axial seal mounted on a rotating component. Referring to FIG. 9, the seal 104 extends from a rotating component 132 by an integrally or mechanically attached extending seal arm 134. The component 132 rotates about the axis A and the seal 104 interacts with the ferro-fluid 100.

In a further example, the ferro-fluid sealing system 106 includes a cooler 136 utilizing the known effect of temperature on ferro-fluid 100 magnetic properties. Ferro-fluid 100 transport can thus be influenced. For example, cooler ferro-fluid 100 is more magnetic and displaces the warmer ferro-fluid 100 as it is pulled toward a magnetic field with more force. A heat load Q may be applied to the ferro-fluid 100 in a localized environment of the air seal to provide controlled convection of ferro-fluid 100 to or from the seal gland 104 by changing the local magnetic properties of the ferro-fluid 100. For instance, heating the ferro-fluid 100 in a first area may cause it to be pulled towards the magnetic field 101 (not shown) and thus cooler ferro-fluid 100 may flow into the first area from a second area. The heat load Q may be electromagnetically induced, may be created by rotor interactions, or may be derived from another source.

FIG. 10b schematically shows a portion of the gas turbine engine 20. The cooler 136 may be located, for example, at location 138 in the bypass flow B flow stream, location 140 in a secondary internal engine flowpath provided by a mid-stage bleed 141 from the core flowpath C, or location 142 in a fuel and/or air cooler 144.

Although example embodiments have been disclosed, a worker of ordinary skill in this art would recognize that certain modifications would come within the scope of the claims. For that and other reasons, the following claims should be studied to determine their true scope and content.

What is claimed is:

1. A seal, comprising:
    a sealing gland configured to retain a ferro-fluid; and
    at least one rotating seal, the rotating seal arranged perpendicular to an axis of rotation of a rotating component;
    wherein at least a portion of the one or more rotating seals extends into the sealing gland, the sealing gland defined by an annular channel having lateral spaced apart walls, the rotating seal arranged at a location axially between the walls, and
    wherein the at least one rotating seal is an airfoil tip seal, and the rotating component is an airfoil blade.

2. The air seal of claim 1, wherein the sealing gland is subject to a magnetic field.

3. The air seal of claim 1, wherein the at least one rotating seal is a knife-edge seal.

4. The air seal of claim 1, wherein the sealing gland extends circumferentially around a rotor, the rotor including the at least one rotating seal.

5. The air seal of claim 1, further comprising a ferro-fluid collection drain and a ferro-fluid collection tank.

6. The air seal of claim 1, further comprising a cooler configured to receive the ferro-fluid at a temperature and change the temperature of the ferro-fluid.

7. The air seal of claim 1, wherein the at least one rotating seal includes a magnetic field configured to repel the ferro-fluid.

8. The air seal of claim 1, wherein the at least one rotating seal is located on a seal arm extending from a rotating component.

9. A gas turbine engine, comprising:
    a combustor section arranged fluidly between a compressor section and a turbine section:
    a high pressure area;
    a low pressure area, the high and low pressure areas arranged in one of the compressor and turbine sections;
    a sealing gland subject to a magnetic field and configured to retain a ferro-fluid; and a rotating component having at least one seal configured to seal the high pressure area from the low pressure area, at least a portion of the at least one seal extending into the sealing gland; and
    wherein the at least one rotating seal is a knife edge seal, and the rotating component is one of a turbine and a compressor.

10. The gas turbine engine of claim 9, wherein the at least one seal is located on a seal arm extending from a rotating component, the seal arranged perpendicular to an axis of rotation of the rotating component.

11. The gas turbine engine of claim 9, further comprising a cooler configured to receive the ferro-fluid at a temperature and change the temperature of the ferro-fluid.

12. A method of sealing low pressure air from high pressure air in a gas turbine engine, comprising the steps of:
    providing a sealing gland configured to retain a ferro-fluid;
    distributing the ferro-fluid into the sealing gland;
    providing at least one rotating seal, the rotating seal perpendicular to an axis of rotation of a rotating component, wherein at least a portion of the one or more rotating seals extends into the sealing gland, the sealing gland defined by an annular channel having lateral spaced apart walls , the seal arranged at a location axially between the walls;
    removing the ferro-fluid from the sealing gland; and
    wherein the at least one rotating seal is an airfoil tip seal, and the rotating component is an airfoil blade.

13. The method of claim 12, wherein the step of distributing the ferro-fluid into the sealing gland further comprises the steps of:
    applying an alternating magnetic field to the sealing gland;
    allowing the ferro-fluid to form a uniform layer in the sealing gland; and
    applying a static magnetic field to the sealing gland.

14. The method of claim 12, further comprising the step of adjusting the magnetic field to adjust the ferro-fluid to air surface.

15. The method of claim 12, wherein the ferro-fluid is distributed into the sealing gland during an engine start-up sequence.

16. The method of claim 12, wherein the ferro-fluid is removed from the sealing gland during engine shut-down.

* * * * *